(12) United States Patent
Togawa et al.

(10) Patent No.: US 10,679,645 B2
(45) Date of Patent: Jun. 9, 2020

(54) CONFUSED STATE DETERMINATION DEVICE, CONFUSED STATE DETERMINATION METHOD, AND STORAGE MEDIUM

(71) Applicant: FUJITSU LIMITED, Kawasaki-shi, Kanagawa (JP)

(72) Inventors: Taro Togawa, Kawasaki (JP); Sayuri Nakayama, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 15/980,226

(22) Filed: May 15, 2018

(65) Prior Publication Data

US 2018/0261238 A1 Sep. 13, 2018

Related U.S. Application Data

(63) Continuation of application No. PCT/JP2015/082437, filed on Nov. 18, 2015.

(51) Int. Cl.

| | |
|---|---|
| *G10L 25/63* | (2013.01) |
| *G10L 25/51* | (2013.01) |
| *H04M 3/51* | (2006.01) |
| *G10L 15/22* | (2006.01) |
| *H04M 3/428* | (2006.01) |
| *G10L 25/90* | (2013.01) |

(Continued)

(52) U.S. Cl.
CPC .............. *G10L 25/51* (2013.01); *G10L 15/22* (2013.01); *G10L 25/63* (2013.01); *H04M 3/4285* (2013.01); *H04M 3/5175* (2013.01); *G10L 25/06* (2013.01); *G10L 25/21* (2013.01); *G10L 25/78* (2013.01); *G10L 25/90* (2013.01)

(58) Field of Classification Search
CPC ................................ G10L 25/63; G10L 15/22
See application file for complete search history.

(56) References Cited

U.S. PATENT DOCUMENTS

| | | | |
|---|---|---|---|
| 5,432,886 A | 7/1995 | Tsukada et al. | |
| 7,197,460 B1* | 3/2007 | Gupta | G06F 3/167 704/270.1 |

(Continued)

FOREIGN PATENT DOCUMENTS

| | | |
|---|---|---|
| JP | 4-255900 | 9/1992 |
| JP | 2000-66691 | 3/2000 |

(Continued)

OTHER PUBLICATIONS

English Abstract for Japanese Patent Publication No. 2005-242891, published Sep. 8, 2005.

(Continued)

*Primary Examiner* — Jialong He
(74) *Attorney, Agent, or Firm* — Staas & Halsey LLP

(57) ABSTRACT

A confused state determination device that includes: an audio receiver that receives input of call audio; a memory; and a processor that is connected to the memory and that is configured to detect a questioning utterance in a call-hold duration of the call audio, compute a frequency of the questioning utterance detected in the call-hold duration, and determine a user to be in a confused state in a case in which the computed questioning utterance frequency is a first threshold value or greater.

13 Claims, 10 Drawing Sheets

(51) Int. Cl.
*G10L 25/78* (2013.01)
*G10L 25/21* (2013.01)
*G10L 25/06* (2013.01)

(56) References Cited

U.S. PATENT DOCUMENTS

| | | | |
|---|---|---|---|
| 2003/0050908 A1* | 3/2003 | Kreulen | G06F 16/355 |
| 2005/0060217 A1* | 3/2005 | Douglas | G06Q 10/06 |
| | | | 705/7.14 |
| 2005/0108094 A1* | 5/2005 | Hugron | G06Q 30/02 |
| | | | 705/14.44 |
| 2006/0206818 A1* | 9/2006 | Utter | G06Q 10/10 |
| | | | 715/705 |
| 2008/0260138 A1* | 10/2008 | Chen | H04M 3/5238 |
| | | | 379/215.01 |
| 2011/0071825 A1 | 3/2011 | Emori et al. | |
| 2014/0081639 A1 | 3/2014 | Kawashima et al. | |
| 2015/0095267 A1* | 4/2015 | Behere | G06F 16/3329 |
| | | | 706/11 |
| 2016/0225273 A1* | 8/2016 | Baruah | G09B 7/02 |

FOREIGN PATENT DOCUMENTS

| | | |
|---|---|---|
| JP | 2004-226881 | 8/2004 |
| JP | 2004-252668 | 9/2004 |
| JP | 2005-242891 | 9/2005 |
| JP | 2006-267464 | 10/2006 |
| JP | 2007-4000 | 1/2007 |
| JP | 2007-79363 | 3/2007 |
| JP | 2008-134557 | 6/2008 |
| WO | WO 2009/145192 A1 | 12/2009 |
| WO | WO 2012/120656 A1 | 9/2012 |

OTHER PUBLICATIONS

English Abstract for Japanese Patent Publication No. 2004-252668, published Sep. 9, 2004.
English Abstract for Japanese Patent Publication No. 2006-267464, published Oct. 5, 2006.
English Abstract for Japanese Patent Publication No. 2007-79363, published Mar. 29, 2007.
English Abstract for Japanese Patent Publication No. 4-255900, published Sep. 10, 1992.
English Abstract for Japanese Patent Publication No. 2000-66691, published Mar. 3, 2000.
English Abstract for Japanese Patent Publication No. 2008-134557, published Jun. 12, 2008.
Espacenet English Abstract for International Patent Publication No. WO 2009/145192 A1, published Dec. 3, 2009.
Espacenet English Abstract for International Patent Publication No. WO 2012/120656 Al, published Sep. 13, 2012.
English Abstract for Japanese Patent Publication No. 2007-4000, published Jan. 11, 2007.
English Abstract for Japanese Patent Publication No. 2004-226881, published Aug. 12, 2004.
International Search Report dated Feb. 2, 2016 in corresponding International Patent Application No. PCT/JP2015/082437.
Kenji Minami, "The Psychological Function of Monologue", Tezukayama University, Contemporary Human Life Science, vol. 10, p. 85-93, Feb. 2014.

* cited by examiner

FIG.9

| |
|---|
| (〜)ですか(？)<br>(~) DESUKA (?) |
| (〜)だよね(？)<br>(~) DAYONE (?) |
| (〜)かな(？)<br>(~) KANA (?) |
| (〜)だっけ(？)<br>(~) DAKKE (?) |

FIG.10

| | |
|---|---|
| 何で | NANNDE |
| なぜ | NAZE |
| どうして | DOUSHITE |
| 何が | NANIGA | ced operator finds it difficult to give an appropriate
CONFUSED STATE DETERMINATION DEVICE, CONFUSED STATE DETERMINATION METHOD, AND STORAGE MEDIUM

CROSS-REFERENCE TO RELATED APPLICATION

This application is a continuation application of International Application No. PCT/JP/2015/082437, filed Nov. 18, 2015, the disclosure of which is incorporated herein by reference in its entirety.

FIELD

The embodiments discussed herein are related to a confused state determination device, a confused state determination method, and a storage medium.

BACKGROUND

Sometimes situations arise during a call between an operator in a call center and a customer, for example, when an inexperienced operator is in a confused state due to a complaint or the like from the customer, and the inexperienced operator finds it difficult to give an appropriate response. So that an experienced operator can assist the inexperienced operator who is in a confused state in such cases, technology exists that can be employed to determine whether or not the operator is in a confused state. This technology determines the intention of a speaker based on changes in meter in the call audio. For example, in this technology, the speaker is detected as having doubts, namely, that there is a possibility of the speaker being in a confused state, when a sustained utterance duration is short and the fundamental frequency thereof is inflected upward.

RELATED PATENT DOCUMENTS

Japanese Laid-Open Patent Publication No. 2007-079363
Japanese Laid-Open Patent Publication No. H04-255900
Japanese Laid-Open Patent Publication No. 2000-66691
Japanese Laid-Open Patent Publication No. 2008-134557
International Publication (WO) No. 2009/145192

RELATED NON-PATENT DOCUMENT

"The Psychological Function of Monologue" by Kenji MINAMI, published in the Journal of Contemporary Human Life Science, Tezukayama University, Vol. 10, pages 85 to 93, February 2014.

SUMMARY

According to an aspect of the embodiments, a confused state determination device includes: an audio receiver that receives input of call audio; a memory; and a processor that is connected to the memory and that is configured to detect a questioning utterance in a call-hold duration of the call audio, compute a frequency of the questioning utterance detected in the call-hold duration, and determine a user to be in a confused state in a case in which the computed questioning utterance frequency is a first threshold value or greater.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a schematic diagram illustrating an example of phrases stored in a phase storage section according to the second exemplary embodiment.

FIG. 10 is a schematic diagram illustrating an example of phrases stored in a phase storage section according to a third exemplary embodiment.

DESCRIPTION OF EMBODIMENTS

First Exemplary Embodiment

Detailed explanation follows regarding example exemplary embodiments of technology disclosed herein, with reference to the drawings.

Figure 1:
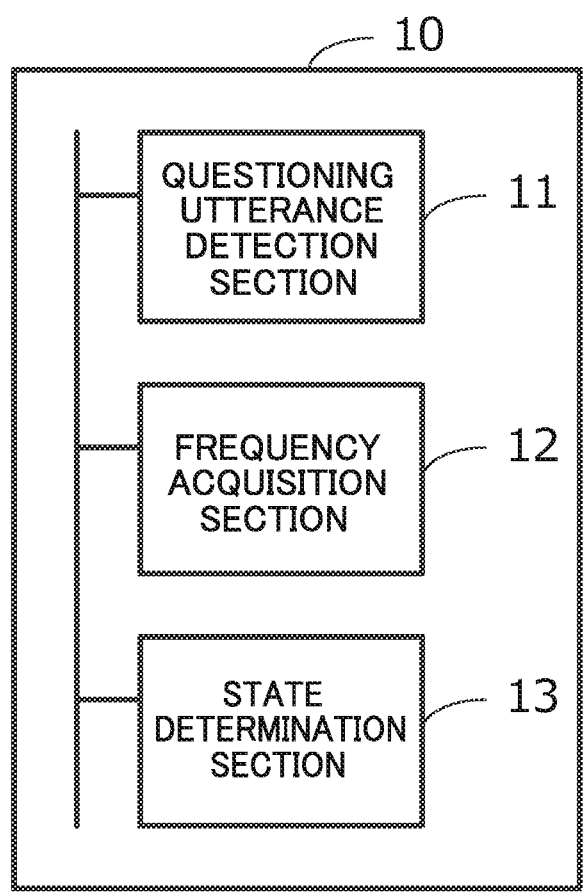
FIG. 1 is a block diagram illustrating an example of relevant functions of a confused state determination device according to a first exemplary embodiment.

As an example, a confused state determination device 10 is illustrated in FIG. 1. The confused state determination device 10 includes, for example, a questioning utterance detection section 11, a frequency acquisition section 12, and a state determination section 13. The questioning utterance detection section 11, the frequency acquisition section 12, and the state determination section 13 are connected together.

The questioning utterance detection section 11 detects questioning utterances contained in audio of a user. The frequency acquisition section 12 acquires a frequency of questioning utterances during a call-hold duration, this being the number of occurrences per unit time that questioning utterances were detected by the questioning utterance detection section 11 during the call-hold duration. The state determination section 13 determines that the user is in a confused state when the questioning utterance frequency acquired by the frequency acquisition section 12 is a first threshold value or greater.

The confused state determination device 10, for example, may be a personal computer connectable to a fixed line phone, a smartphone, a mobile phone, or the like, may be a specialized device, or may be part of a fixed line phone, smartphone, mobile phone, or the like.

Figure 2:
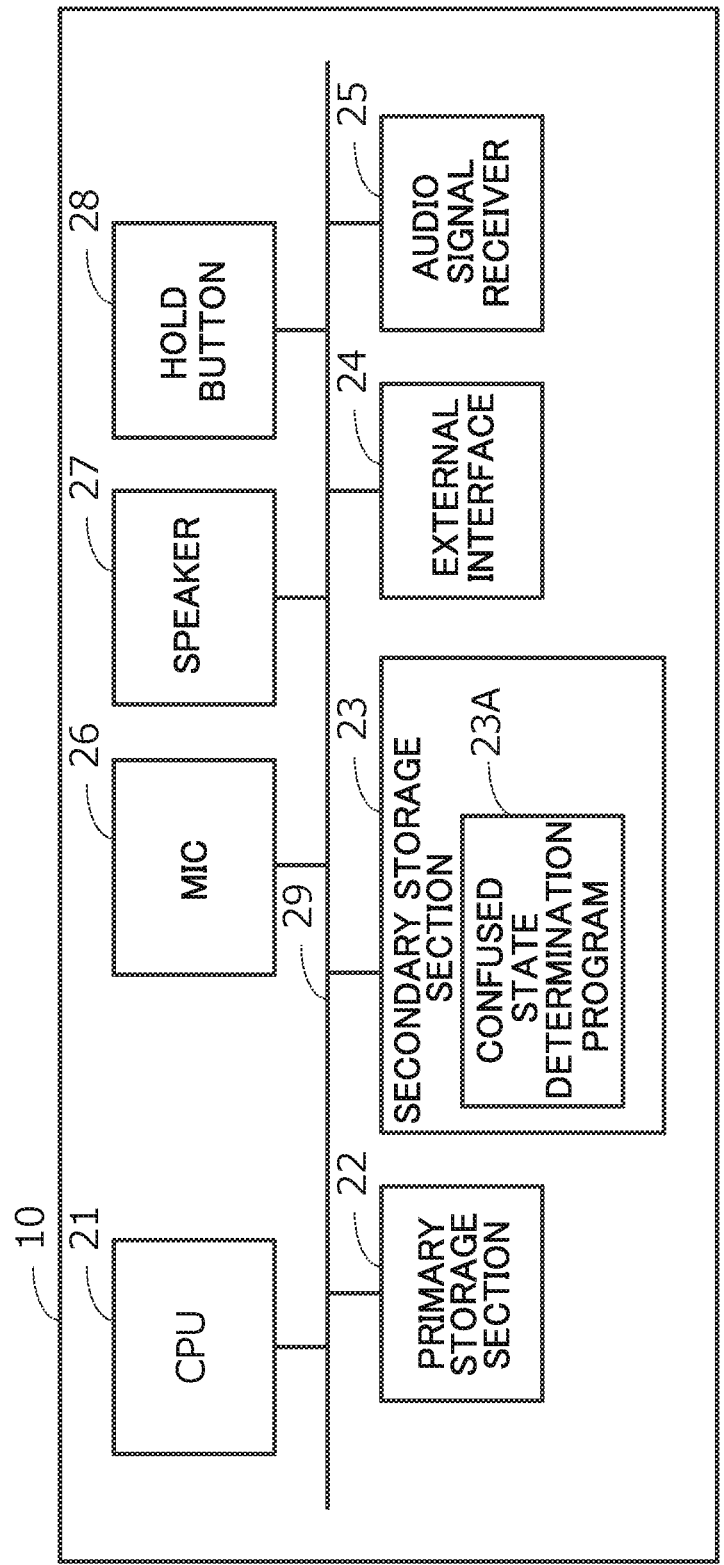
FIG. 2 is a block diagram illustrating an example configuration of hardware of a confused state determination device according to the first exemplary embodiment.

The confused state determination device 10 includes, for example as illustrated in FIG. 2, a central processing unit (CPU) 21, a primary storage section 22, a secondary storage section 23, an external interface 24, an audio signal receiver 25, a microphone (mic) 26, a speaker 27, and a hold button 28. The CPU 21, the primary storage section 22, the secondary storage section 23, the external interface 24, the audio signal receiver 25, the mic 26, the speaker 27, and the hold button 28 are connected together through a bus 29.

External devices connect to the external interface 24. The external interface 24 governs the exchange of various information between the external devices and the CPU 21.

The mic 26 picks up audio of a user, for example, audio containing the utterances of a call center operator utilizing the confused state determination device 10, and converts the audio into an audio signal. Note that FIG. 2 illustrates a case in which the mic 26 is contained in the confused state determination device 10; however, the present exemplary embodiment is not limited thereto. The mic 26 may, for example, be a mic of a calling device, such as a phone connected to the confused state determination device 10, and may be an external mic connected through the external interface 24.

The speaker 27 converts call counterparty audio, for example an audio signal representing audio containing utterances of a customer using the call center, or representing a hold melody, i.e. music, into audio. Note that although FIG. 2 illustrates a case in which the speaker 27 is contained in the confused state determination device 10, the present exemplary embodiment is not limited thereto. The speaker 27 may be a speaker of a calling device, such as a phone connected to the confused state determination device 10, and may be an external speaker connected through the external interface 24.

The CPU 21 puts the call on hold when the hold button 28 is in an ON state, and enables the call to proceed when in the OFF state. Note that although FIG. 2 illustrates a case in which the hold button 27 is contained in the confused state determination device 10, the present exemplary embodiment is not limited thereto. The hold button 28, for example, may be a hold button of a calling device, such as a phone connected to the confused state determination device 10. In such cases, the CPU of the phone puts the call on hold, or enables the call to proceed.

The audio signal receiver 25 receives an audio signal representing audio from the call counterparty side transmitted over a phone line, or over an internet line, or the like.

The primary storage section 22 is, for example, volatile memory such as random access memory (RAM) or the like. The secondary storage section 23 is, for example, non-volatile memory such as a hard disk drive (HDD) or a solid state drive (SSD). The secondary storage section 23 is stored, for example, with a confused state determination program 23A. Note that the confused state determination program 23A may be read from a storage medium such as a CD-ROM, DVD, or the like, or received from an external server, through the external interface 24.

The CPU 21 reads the confused state determination program 23A from the secondary storage section 23, and expands the confused state determination program 23A in the primary storage section 22. By executing the confused state determination program 23A, the CPU 21 operates as the questioning utterance detection section 11, the frequency acquisition section 12, and the state determination section 13 illustrated in FIG. 1.

Next, explanation follows regarding an outline of confused state determination processing executed by the confused state determination device 10. The user of the confused state determination device 10 is, for example, a call center operator. When the operator is in a call with a customer, it is possible that the operator will be in a confused state and unable to respond appropriately when the operator finds it hard to respond to a question from the customer, or the like. The confused state determination device 10 determines whether or not the operator, namely the user, is in a confused state.

Figure 3:
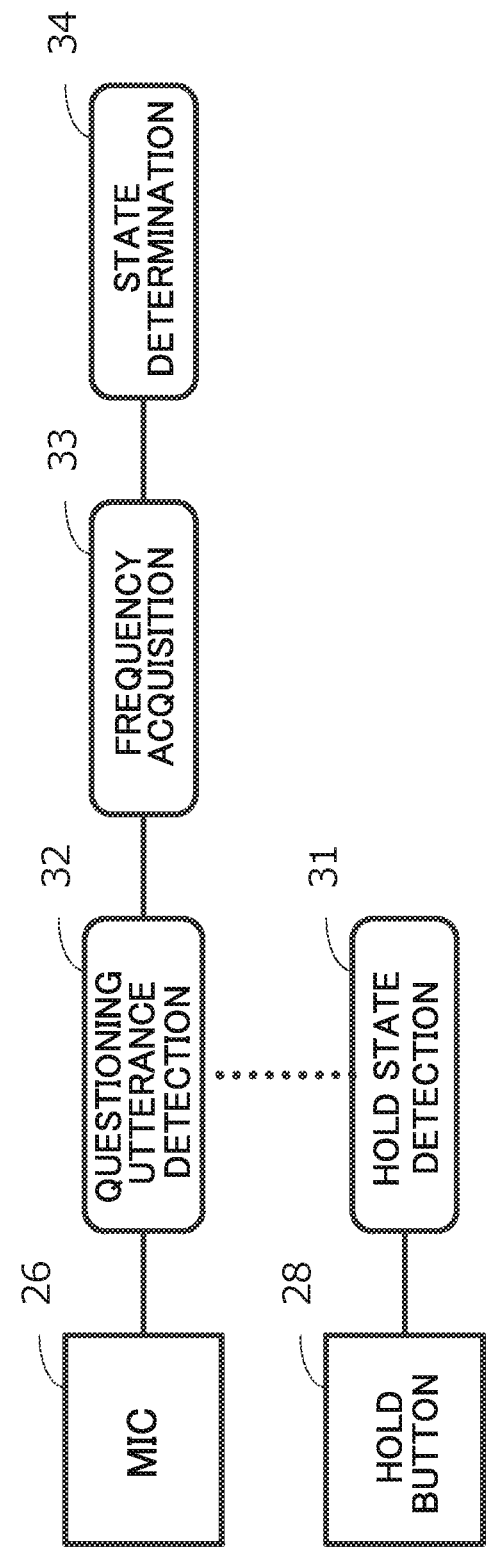
FIG. 3 is a block diagram to explain an outline of an example of confused state determination processing according to the first exemplary embodiment.

As illustrated in FIG. 3, the confused state determination device 10 uses the mic 26 to acquire the utterances of the user. The confused state determination device 10 determines that the call is in a held state using a block 31 when the hold button 28 is in the ON state, and detects for questioning utterances of the user during a call-hold duration using a block 32. The confused state determination device 10 acquires a questioning utterance frequency using a block 33, and, based on the questioning utterance frequency, determines whether or not the user is in a confused state using a block 34.

When it has been determined that the user is in a confused state, the confused state determination device 10, for example, sends notification that the user is in a confused state to a screen on a terminal of a supervisor of the user. This enables the supervisor or the like to give appropriate support to the user.

Figure 4:
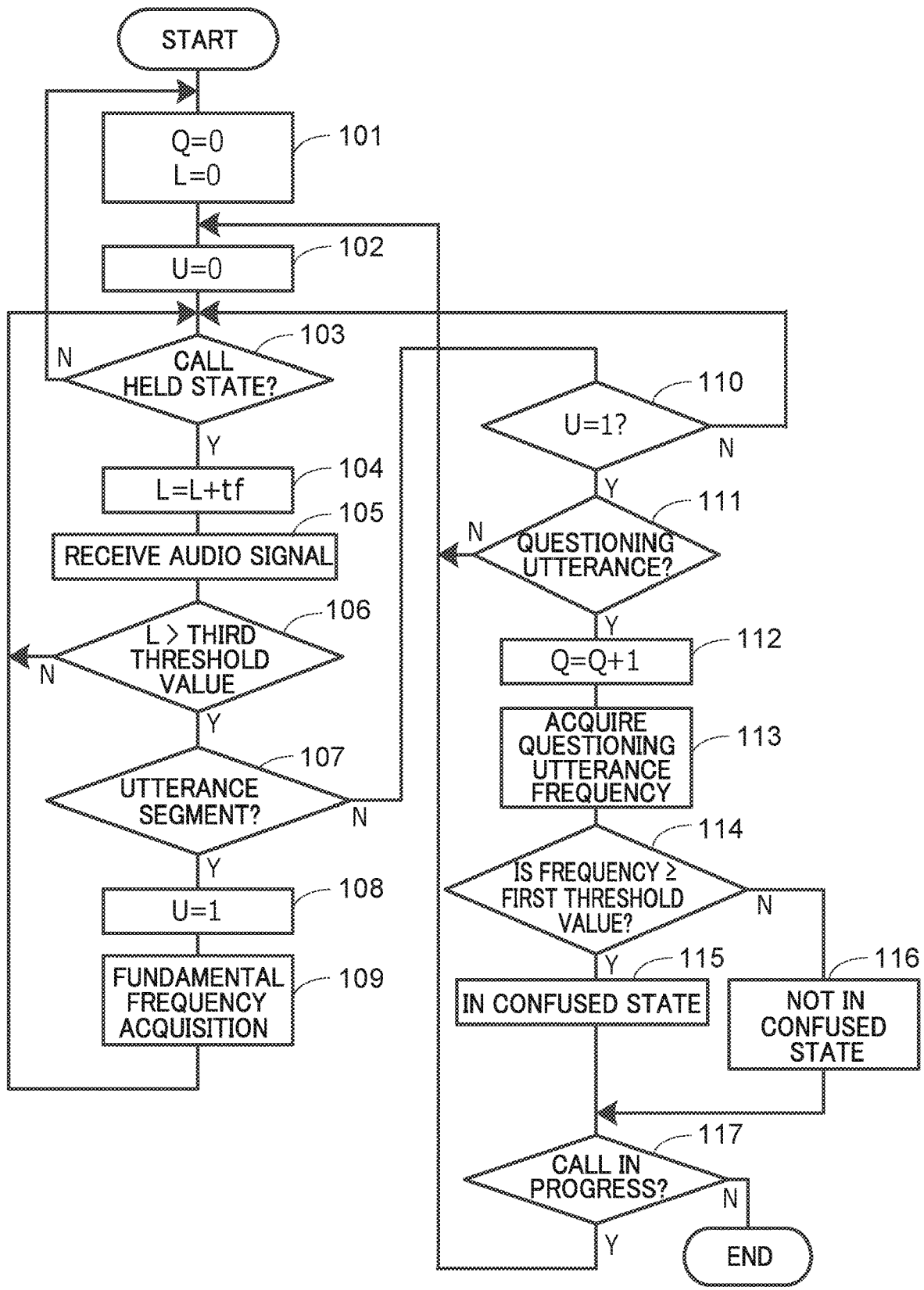
FIG. 4 is a flowchart illustrating an example of confused state determination processing according to the first exemplary embodiment.

As operation of the present exemplary embodiment, explanation follows next regarding confused state determination processing executed by the confused state determination device 10. FIG. 4 illustrates an example of the confused state determination processing executed by the confused state determination device 10.

For example, the confused state determination processing of FIG. 4 is started by the user operating the calling device connected to the confused state determination device 10 and starting a call with the call counterparty. At step 101, the CPU 21 zeros a counter Q for counting the number of questioning utterances (also referred to below as questioning utterance counter Q) and a register L for saving a call-hold duration (also referred to below as call-hold duration register L). At step 102, the CPU 21 zeros a flag U (also referred to below as utterance segment flag U) indicating the passage or not of a segment of utterance, namely, whether or not an utterance is being uttered.

At step 103, the CPU 21 determines whether or not the call is in a held state. The CPU 21, for example, determines there to be a call held state when the hold button 28 is in the ON state. When negative determination is made at step S103, the CPU 21 returns to step 101.

On the other hand, when affirmative determination has been made at step 103, the CPU 21 acquires a call-hold duration at step 104. More specifically, the call-hold duration register L is incremented by one time frame length tf. The one time frame length tf is, for example, 20 milliseconds.

At step 105, the CPU 21 receives one frame's worth of audio signal. The audio signal is audio acquired by the mic 26, namely, an audio signal corresponding to the audio generated on the user side, and is temporarily saved in the primary storage section 22.

At step 106, the CPU 21 determines whether or not the duration that has been accumulated in the call-hold duration register L has exceeded a predetermined third threshold value (also referred to below as a hold duration threshold value). When negative determination is made at step S106, the CPU 21 returns to step 103. On the other hand, when affirmative determination is made at step 106, the CPU 21 determines this as being a call-hold duration, and proceeds to step 107. The hold duration threshold value may, for example, be 30 seconds.

At step 107, the CPU 21 determines whether or not the audio represented by the audio signal received at step 105 is audio of an utterance segment. An utterance segment is a segment containing an utterance of the user. For example, when the power or the signal-to-noise ratio of the audio signal received at step 105 exceeds a predetermined value, the audio represented by this audio signal is determined not to be background noise, and to be an utterance segment containing an utterance of the user.

When affirmative determination is made at step 107, the CPU 21 sets the utterance segment flag U to 1 at step 108. At step 109, the CPU 21 acquires the fundamental frequency of the audio signal.

Figure 5:
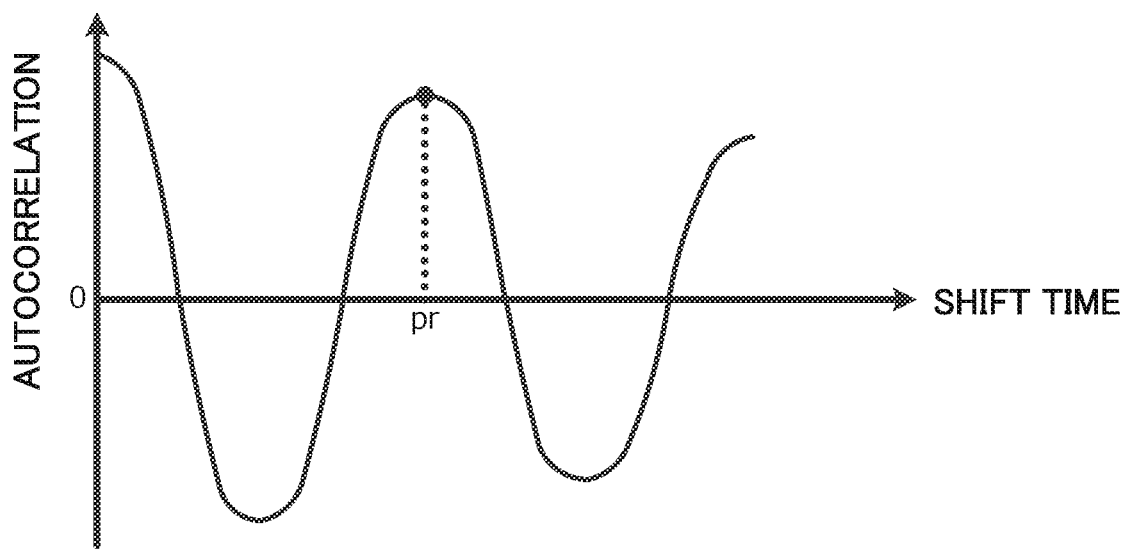
FIG. 5 is a schematic diagram to explain processing to acquire a fundamental frequency according to the first exemplary embodiment.

More specifically, for example as illustrated in FIG. 5, the CPU 21 computes an autocorrelation of the audio signal, and takes the smallest positive position of shift time at a time where the autocorrelation is at a maximum as a fundamental period pr. As expressed by Equation (1), the fundamental frequency is acquired by dividing a sampling frequency Fs by the fundamental period pr.

$$\text{Fundamental frequency} = Fs/pr \qquad \text{Equation (1)}$$

The sampling frequency Fs is, for example, 8,000 Hz.

The CPU 21 then returns to step 103 and repeats the processing of step 103 to step 109. On the other hand, when negative determination is made at step S107, the CPU 21 determines at step 110 whether or not the utterance segment flag U is 1. When negative determination is made at step S110, namely, when the utterance segment flag U is 0, the CPU 21 returns to step 103, since there are no utterances present for which to determine whether or not the utterance is a questioning utterance.

When affirmative determination is made at step 110, as described later, the CPU 21 determines at step 111 whether or not the utterance represented by the audio signal received at step 105 and saved in the primary storage section 22, namely audio of an utterance segment, is a questioning utterance. When negative determination is made at step 111, the CPU 21 returns to step 102.

On the other hand, when affirmative determination is made at step 111, the CPU 21 increments the questioning utterance counter Q by 1 at step 112, and the CPU 21 acquires the questioning utterance frequency, which is the number of occurrences of questioning utterances per unit time, at step 113. More specifically, as expressed by Equation (2), the questioning utterance frequency is acquired by dividing the number of questioning utterances counted in the questioning utterance counter Q by the call-hold duration saved in the call-hold duration register L.

$$\text{Questioning utterance frequency} = Q/L \qquad \text{Equation (2)}$$

At step 114, the CPU 21 determines whether or not the questioning utterance frequency is a predetermined first threshold value (also referred to below as confused threshold value) or greater. Note that the predetermined threshold value is described later.

When affirmative determination is made at step 114, the CPU 21 determines at step 115 that the user is in a confused state, and proceeds to step 117. On the other hand, when negative determination is made at step 114, the CPU 21 determines at step 116 that the user is not in a confused state, and proceeds to step 117.

At step 117, the CPU 21 determines whether or not a call is in progress. When affirmative determination is made at step 117, the CPU 21 returns to step 102. When negative determination is made at step 117, the CPU 21 ends the confused state determination processing. Note that the sequence of steps in FIG. 4 is merely an example thereof, and the present exemplary embodiment is not limited to the sequence of steps in FIG. 4. The same applies to subsequent exemplary embodiments.

Next, explanation follows regarding an example of the determination performed at step 111. At step 111, determination is made as to whether or not an utterance represented by the audio signal received at step 105 and saved in the primary storage section 22 is a questioning utterance. For example, generally when speaking in Japanese, the fundamental frequency is inflected upward at the end of a questioning utterance. Thus, for example, a questioning utterance is determined to be present when the fundamental frequency of an audio signal is inflected upward within a predetermined duration from the end of an utterance segment.

Figure 6:
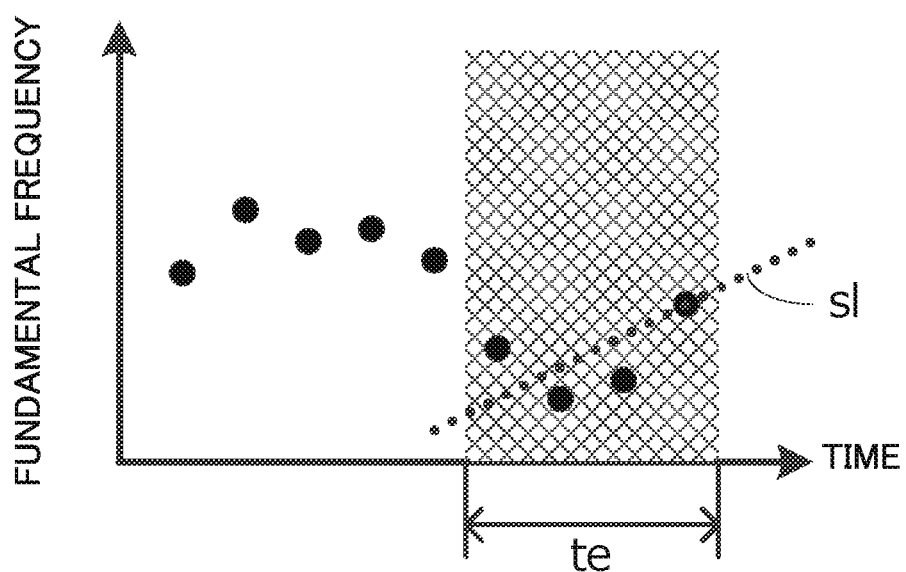
FIG. 6 is a schematic diagram to explain processing to acquire a slope of a fundamental frequency according to the first exemplary embodiment.

More specifically, for example as illustrated in FIG. 6, a straight line sl approximation to the fundamental frequency in a predetermined duration te at the end of an utterance segment is acquired by a least squares method, and a questioning utterance is determined to be present when the slope of the straight line sl is positive and greater than a predetermined second threshold value (also referred to below as questioning utterance threshold value). The predetermined duration te at the end of an utterance segment may, for example, be 1 second. Note that after the determination at step 111 has been completed, the audio signal received at step 105 and saved in the primary storage section 22 may be erased.

Figure 7:
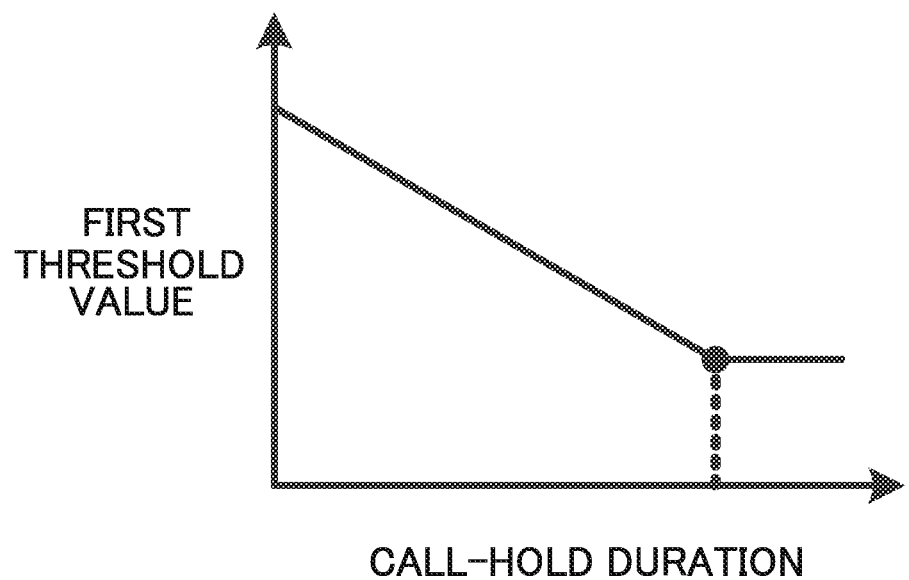
FIG. 7 is a schematic diagram to explain processing to set a first threshold value according to the first exemplary embodiment.

Next, explanation follows regarding an example of a confused threshold value employed in the determination of step 114. At step 114, determination is made as to whether or not the questioning utterance frequency is the confused threshold value or greater. The confused threshold value may be a fixed value, or as illustrated in FIG. 7, may be set so as to decrease as the call-hold duration lengthens. Generally, when a user is in a confused state, a call-hold duration gets longer, in order to resolve the cause of the confused state or simply to think about how to respond. Thus, when the call-hold duration is longer, it can be assumed that there is a high possibility that the user is in a confused state, even if the questioning utterance frequency is comparatively small.

In the present exemplary embodiment, questioning utterances contained in the audio of the user are detected, the questioning utterance frequency, which is the number of questioning utterances detected in the call-hold duration, is acquired, and the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring the frequency of questioning utterances in the call-hold duration and determining the user to be in a confused state when this frequency is the confused threshold value or greater, it is possible to increase the precision of determination of a confused state of the user.

Moreover, in the present exemplary embodiment, the confused threshold value changes so as to decrease as the call-hold duration lengthens. Generally, when a user is in a confused state, a call-hold duration gets longer, to resolve the cause of the confused state or simply to think about how to respond. Thus, when the call-hold duration is longer, it can be assumed that there is a high possibility that the user is in a confused state, even if the questioning utterance frequency is comparatively small. Thus, by changing the confused threshold value so as to become smaller as the call-hold duration gets longer, it is possible to increase the precision of determination of the confused state of a user.

Moreover, in the present exemplary embodiment, the audio in an utterance duration is detected as being a questioning utterance when the slope of the fundamental frequency of the audio at the end of the utterance duration is greater than the questioning utterance threshold value. For example, generally when speaking in Japanese, the fundamental frequency is inflected upward at the end of a questioning utterance. Thus, by detecting audio in an utterance duration as being a questioning utterance when the slope of the fundamental frequency of audio at the end of the utterance duration is greater than the questioning utterance threshold value, it is possible to increase the precision of determining the confused state of the user.

Second Exemplary Embodiment

Next, explanation follows regarding a second exemplary embodiment which is an example of an exemplary embodiment of technology disclosed herein. Explanation of configuration and operation similar to those of the first exemplary embodiment will be omitted.

Figure 8:
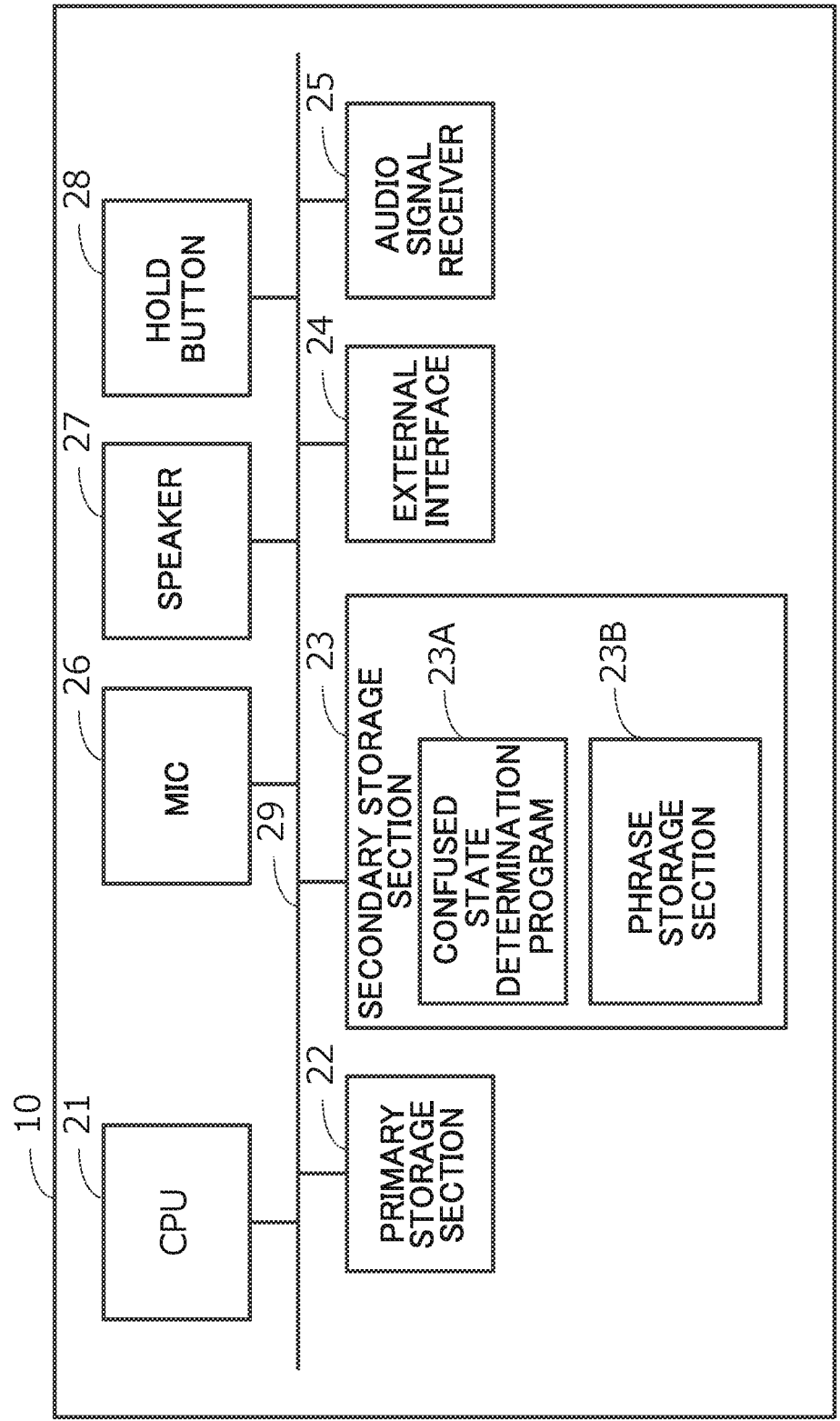
FIG. 8 is a block diagram illustrating an example configuration of hardware of a confused state determination device according to a second exemplary embodiment.

In the second exemplary embodiment, when detecting a questioning utterance, a questioning utterance is determined when a predetermined phrase is contained in the end of an utterance. In the second exemplary embodiment, as illustrated in FIG. 8, the secondary storage section 23 includes a phrase storage section 23B. FIG. 9 illustrates examples of predetermined phrases contained in the phrase storage section 23B. The predetermined phrases are phrases generally employed at the end of an interrogative sentence, which, in the case of Japanese include, for example, " . . . desu ka(?)", " . . . da yo ne(?)", " . . . kana(?)", and " . . . dakke(?)".

At step 111 in FIG. 4, the CPU 21 recognizes the utterance contained in the end of an utterance segment, determines whether or not the utterance contains any of the predetermined phrases contained in the phrase storage section 23B, and determines the utterance to be a questioning utterance when this determination is affirmative. The end of the utterance segment means within a predetermined duration from the end of the utterance segment.

Determination as to whether or not an utterance contains any of the predetermined phrases may, for example, be performed by converting an utterance to text, and matching the text of the predetermined phrases contained in the phrase storage section 23B against the converted text. Moreover, matching may also be performed of audio data that is generated using an acoustic model and represents the predetermined phrases contained in the phrase storage section 23B, against audio data of the utterance.

Moreover, the utterance may be determined as containing any of the predetermined phrases when a degree of similarity, such as a distance between a feature vector of any of the predetermined phrases contained in the phrase storage section 23B and a feature vector of the utterance, a feature vector appearance probability, or the like is higher than a predetermined value.

Note that although the example illustrated in FIG. 9 is for Japanese, there is no limitation to Japanese, and the present exemplary embodiment may be applied to other languages.

In the case of English, examples of predetermined phrases contained in the phrase storage section 23B include "doesn't it(?)", "don't they(?)", "isn't it(?)", and "aren't they(?)". In the case of Chinese, these include the following:

吗,吧,啊,没有 or the like

Note that, for example, phrases contained with a high frequency of occurrence in the end of questioning utterances in a corpus may be recorded in the phrase storage section 23B as the predetermined phrases. Moreover, a user (or supervisor) may record phrases contained in the end of questioning utterances often used by the user in the phrase storage section 23B as predetermined phrases.

Note that the present exemplary embodiment may be applied to the first exemplary embodiment. Namely, audio in an utterance duration may be detected as being a questioning utterance in at least one case out of a case in which the slope of the fundamental frequency of audio at the end of an utterance duration is greater than the questioning utterance threshold value, or a case in which a predetermined phrase is contained in the end of the utterance duration.

In the present exemplary embodiment, a questioning utterance contained in the audio of a user is detected, the frequency of questioning utterances detected in the call-hold duration is acquired, and the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring, in a duration, the frequency of questioning utterances in the call-hold duration and determining the user to be in a confused state when this frequency is the confused threshold value or greater, it is possible to increase the precision of determination of a confused state of the user.

In the present exemplary embodiment, when a predetermined phrase is contained in the end of an utterance duration, the audio in the utterance duration is detected as being a questioning utterance. A questioning utterance generally contains a predetermined phrase at the end. Thus, in the present exemplary embodiment, when a predetermined phrase is contained in the end of an utterance duration, by detecting the audio in the utterance duration to be a questioning utterance, it is possible to increase the precision of determination of a confused state of the user.

Third Exemplary Embodiment

Next, explanation follows regarding a third exemplary embodiment, which is an example of an exemplary embodiment of technology disclosed herein. Explanation of configuration and operation similar to those of the first exemplary embodiment and the second exemplary embodiment will be omitted In the third exemplary embodiment, when detecting a questioning utterance, when a predetermined phrase is contained at the beginning of an utterance, a questioning utterance is determined to be present. FIG. 10 illustrates examples of predetermined phrases contained in the phrase storage section 23B of FIG. 8 in the third exemplary embodiment. The predetermined phrases are phrases generally employed at the beginning of an interrogative sentence, which in the case of Japanese include, for example, "nande", "naze", "doushite", and "nani ga".

At step 111 of FIG. 4, the CPU 21 recognizes the utterance contained at the beginning of an utterance segment, determines whether or not the utterance contains any of the predetermined phrases contained in the phrase storage section 23B, and determines the utterance to be a questioning utterance when this determination is affirmative. The beginning of an utterance segment means within a predetermined duration from the start of the utterance segment.

Determination as to whether or not an utterance contains any of the predetermined phrases may, for example, be performed by converting an utterance to text, and matching the text of the predetermined phrases contained in the phrase storage section 23B against the converted text. Moreover, matching may also be performed of audio data that is generated using an acoustic model and represents the predetermined phrases contained in the phrase storage section 23B, against audio data of the utterance.

Note that the utterance may be determined as containing any of the predetermined phrases when a degree of similarity, such as a distance between a feature vector of any of the predetermined phrases contained in the phrase storage section 23B and a feature vector of the utterance, a feature vector appearance probability, or the like is higher than a predetermined value.

Note that although the example illustrated in FIG. 10 is for Japanese, there is no limitation to Japanese, and the present exemplary embodiment may be applied to other languages.

In the case of English, examples of predetermined phrases contained in the phrase storage section 23B include "What", "Where", "Why", and "How". In the case of Chinese, these include the following: 什么,哪里,为什么,怎么
or the like Note that, for example, phrases contained with a high frequency of occurrence at the beginning of questioning utterances in a corpus may be recorded in the phrase storage section 23B as the predetermined phrases. Moreover, a user (or supervisor) may record phrases contained at the beginning of questioning utterance often used by the user in the phrase storage section 23B as predetermined phrases.

Note that the present exemplary embodiment may be applied to at least one out of the first exemplary embodiment or the second exemplary embodiment. Namely, the audio in an utterance duration may be detected as being a questioning utterance in at least one case out of a case in which the slope of the fundamental frequency of audio at the end of an utterance duration is greater than the questioning utterance threshold value, or a case in which a predetermined phrase is contained in at least one out of the beginning or the end of the utterance duration.

In the present exemplary embodiment, a questioning utterance contained in the audio of a user is detected, the frequency of questioning utterances detected in the call-hold duration is acquired, and the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring the frequency of questioning utterances in the call-hold duration and determining the user to be in a confused state when this frequency is the confused threshold value or greater, it is possible to increase the precision of determination of a confused state of the user.

In the present exemplary embodiment, when a predetermined phrase is contained at the beginning of an utterance duration, the audio in the utterance duration is detected as being a questioning utterance. A questioning utterance generally contains a predetermined phrase at the beginning. Thus, in the present exemplary embodiment, when a predetermined phrase is contained in the beginning of an utterance duration, by detecting the audio in the utterance duration to be a questioning utterance it is possible to increase the precision of determination of a confused state of the user.

Fourth Exemplary Embodiment

Next, explanation follows regarding a fourth exemplary embodiment as an example of an exemplary embodiment of technology disclosed herein. Explanation of configuration and operation similar to those of the first exemplary embodiment to the third exemplary embodiment will be omitted.

Figure 11:
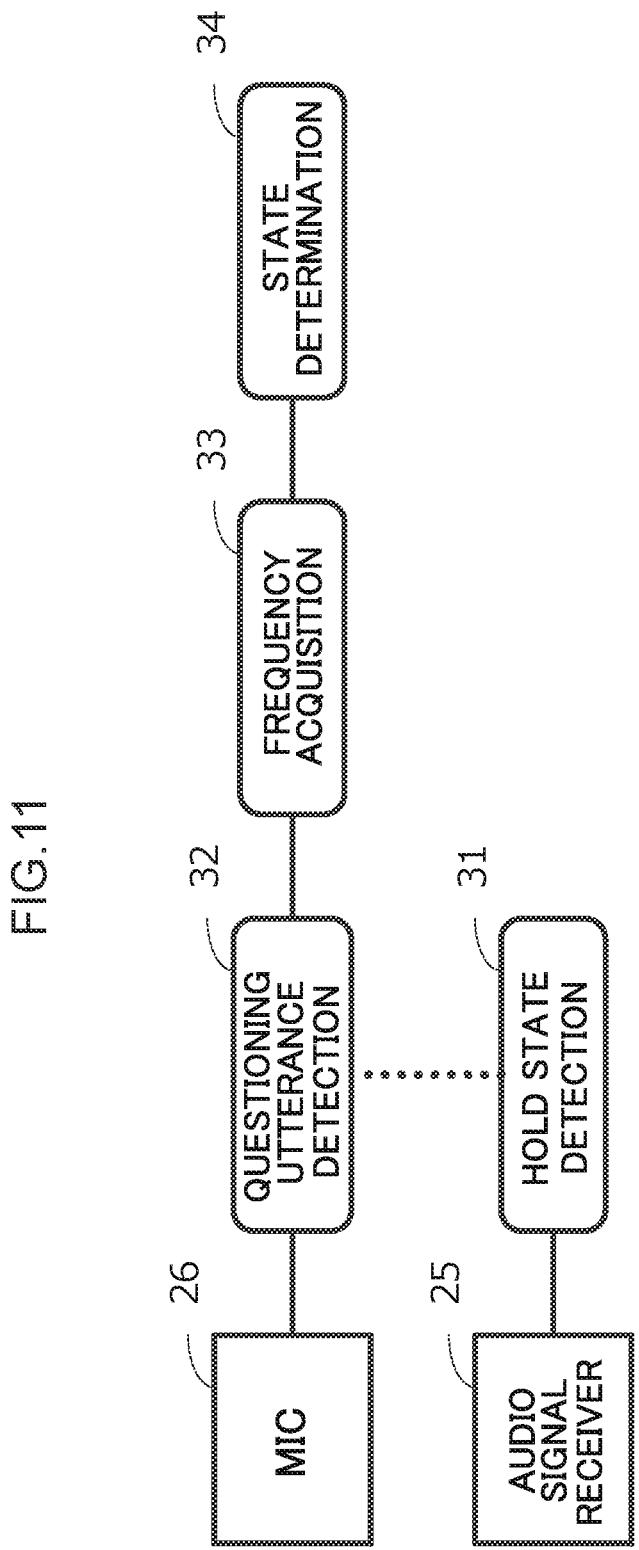
FIG. 11 is a block diagram to explain an outline of an example of confused state determination processing according to a fourth exemplary embodiment.

In the fourth exemplary embodiment, when determining whether or not there is a call held state, as illustrated in FIG. 11, an audio signal received by the audio signal receiver 25 is employed.

The CPU 21 determines there to be a call held state when, for example at step 103 of FIG. 4, audio represented by the audio signal received by the audio signal receiver 25 is silent. Silent means, for example, cases in which the signal-to-noise ratio of the audio signal is smaller than a predetermined value. This is because, during a call held state, the audio generated on the call counterparty side, namely, the utterances of the call counterparty and the background noise on the call counterparty side, is muted for the user.

Note that the call held state may be determined for cases in which the signal-to-noise ratio of the audio signal is, for example, less than 10 dB. Moreover, silence may be determined when the power of the audio signal received by the audio signal receiver 25 is smaller than a predetermined value.

Note that the present exemplary embodiment may be applied to at least one out of the first exemplary embodiment to the third exemplary embodiment. Namely, the present exemplary embodiment too may detect the audio in an utterance duration as being a questioning utterance in at least one case out of a case in which the slope of the fundamental frequency of audio at the end of an utterance duration is greater than the questioning utterance threshold value, or a case in which a predetermined phrase is contained in at least one out of the beginning or the end of the utterance duration.

In the present exemplary embodiment, by detecting questioning utterances contained in the audio of a user and acquiring the frequency of questioning utterances detected in the call-hold duration, the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring the frequency of questioning utterances in the call-hold duration and determining the user to be in a confused state when this frequency is the confused threshold value or greater, it is possible to increase the precision of determination of a confused state of the user.

In the present exemplary embodiment, the call-hold duration is detected based on the audio signal representing the audio of the call counterparty. Moreover, in the present exemplary embodiment, silent durations that are silent durations in the audio of the call counterparty longer than a hold duration threshold value are detected as being a call-hold duration. This is because, during a call-hold duration, the audio generated on the call counterparty side, namely, the utterances of the call counterparty and the background noise on the call counterparty side, is muted for the user. Thus, by detecting silent durations in the audio of the call counterparty that are silent durations longer than the hold duration threshold value as being a call-hold duration, it is possible to increase the precision of determination of a confused state of the user.

Fifth Exemplary Embodiment

Explanation follows regarding a fifth exemplary embodiment as an example of an exemplary embodiment of technology disclosed herein. Explanation of configuration and operation similar to those of the first exemplary embodiment to the fourth exemplary embodiment will be omitted.

In the fifth exemplary embodiment, when determining whether or not there is a call held state, as illustrated in FIG. 11, an audio signal received by the audio signal receiver 25 is employed.

The CPU 21, for example as at step 103 of FIG. 4, determines whether or not the audio represented by the audio signal received by the audio signal receiver 25 is music. This is because generally music, such as a hold melody, is played during a call-hold duration.

Whether or not there is music is determined, for example, based on sound density. A waveform representing the power of an audio signal expressing music is smoother than a waveform of power of an audio signal expressing an utterance, and when such waveforms have been normalized, a density of audio containing music is higher than a density of audio containing utterances.

Note that prior to determining whether or not there is a call held state at step 103, the audio signal received by the audio signal receiver 25 may be cumulatively stored for a predetermined duration, and then the determination of step 103 performed using the cumulatively stored audio signal. The predetermined duration may, for example, be one second.

Note that the present exemplary embodiment may be applied to at least one out of the first exemplary embodiment to the third exemplary embodiment. Namely, the present exemplary embodiment too may detect the audio in an utterance duration as being a questioning utterance in at least one case out of a case in which the slope of the fundamental frequency of audio at the end of an utterance duration is greater than the questioning utterance threshold value, or a case in which a predetermined phrase is contained in at least one out of the beginning or the end of the utterance duration.

In the present exemplary embodiment, by detecting questioning utterances contained in the audio of a user, and acquiring the frequency of questioning utterances detected in the call-hold duration, the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring the frequency of questioning utterances in the call-hold duration and determining the user to be in a confused state when this frequency is the confused threshold value or greater, it is possible to increase the precision of determination of a confused state of the user.

In the present exemplary embodiment, the call-hold duration is detected based on the audio signal expressing the audio of the call counterparty. Moreover, in the present exemplary embodiment, music durations that are music durations in the audio of the call counterparty longer than the hold duration threshold value are detected as being a call-hold duration. This is because generally music, such as a hold melody, is played during a call-hold duration. Thus, by detecting music durations that are music durations in the audio of the call counterparty longer than the hold duration threshold value as the call-hold duration, it is possible to increase the precision of determination of a confused state of the user.

Sixth Exemplary Embodiment

Next, explanation follows regarding a sixth exemplary embodiment as an example of an exemplary embodiment of technology disclosed herein. Explanation of configuration and operation similar to those of the first exemplary embodiment to the fifth exemplary embodiment will be omitted.

Figure 12:
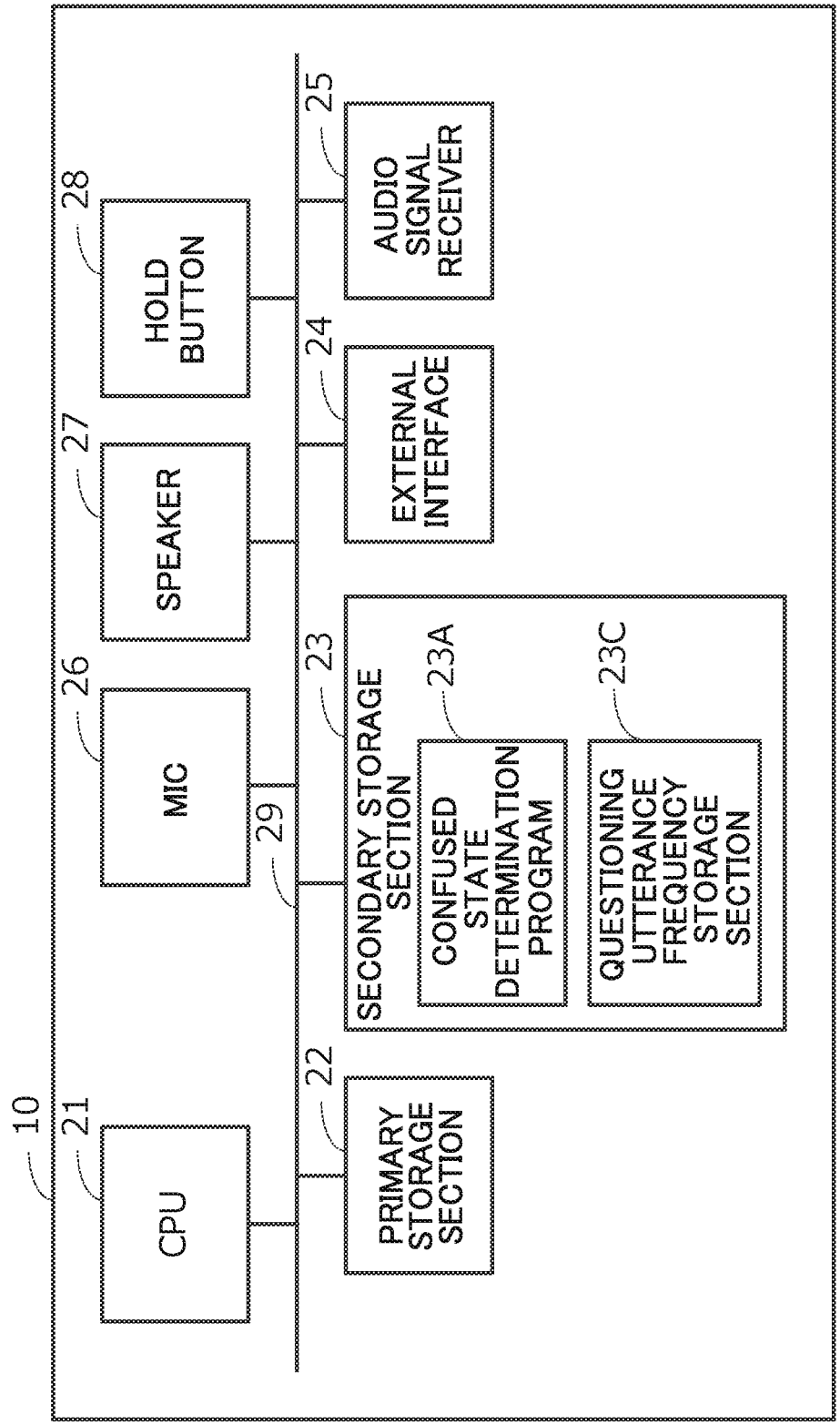
FIG. 12 is a block diagram illustrating an example configuration of hardware of a confused state determination device according to a sixth exemplary embodiment.

In the sixth exemplary embodiment, a confused threshold value to determine whether or not there is a confused state is set based on a frequency of questioning utterances acquired for a past call-hold duration. In the sixth exemplary embodiment, as illustrated in FIG. 12, the secondary storage section 23 includes a questioning utterance frequency storage section 23C that cumulatively stores a questioning utterance frequency acquired for a past call-hold duration.

In cases in which, for example at step 103 of FIG. 4, it is determined that there is no call held state and the questioning utterance frequency is acquired at step 113, the CPU 21 cumulatively stores the questioning utterance frequency in the questioning utterance frequency storage section 23C. The CPU 21 computes the confused threshold value used at step 114 based on the questioning utterance frequency cumulatively stored in the questioning utterance frequency storage section 23C. More specifically, for example, as represented by Equation (3), a value of an average value Fave of the questioning utterance frequencies cumulatively stored in the questioning utterance frequency storage section 23C, multiplied by a predetermined value Ca, may be employed as the confused threshold value.

Confused threshold value=$F_{ave} \times C_a$

Note that a central value, a minimum value, or the like of the questioning utterance frequency may be employed instead of the average value Fave of the questioning utterance frequency, and a predetermined value may be added instead of multiplying by a predetermined value.

Note that the present exemplary embodiment may be applied to at least one out of the first exemplary embodiment to the fifth exemplary embodiment. Namely, the present exemplary embodiment too may detect the audio in an utterance duration as being a questioning utterance in at least one case out of a case in which the slope of the fundamental frequency of audio at the end of an utterance duration is greater than the questioning utterance threshold value, or a case in which a predetermined phrase is contained in at least one out of the beginning or the end of the utterance duration. Moreover, in the present exemplary embodiment, silent durations that are silent durations in the audio of the call counterparty longer than the hold duration threshold value may be detected as the call-hold duration, or music durations that are music durations in the audio of the call counterparty longer than the hold duration threshold value may be detected as the call-hold duration.

In the present exemplary embodiment, the questioning utterances contained in the audio of a user are detected, the frequency of questioning utterances detected in the call-hold duration is acquired, and the user is determined to be in a confused state when the acquired questioning utterance frequency is the confused threshold value or greater.

People often mutter to themselves when they are in a confused state. However, it is difficult to discriminate whether a questioning utterance during a call is a question to the call counterparty, or just muttering to oneself. Moreover, there are generally few occasions one would mutter to oneself during a call out of consideration toward the call counterparty. Thus, in the present exemplary embodiment, by acquiring in the call-hold duration the frequency of questioning utterances in the call-hold duration and determining the user to be in a confused state when this frequency is the confused threshold value or greater, it is possible to increase the precision of determination of a confused state of the user.

In the present exemplary embodiment, the confused threshold value is computed based on the questioning utterance frequency acquired for a past call-hold duration. Computing the confused threshold value based on the questioning utterance frequency acquired for a past call-hold duration enables the precision of determination of a confused state of the user to be raised. Moreover, the frequency of questioning utterances acquired for a past call-hold duration may be cumulatively stored on a per-user basis. Then, when computing the confused threshold value based on the questioning utterance frequency acquired for the past call-hold duration, it is possible to set the confused threshold value appropriately to the unique characteristics of the user. This enables the precision of determination of a confused state of the user to be raised.

There are instances in which a sustained utterance duration is short and an utterance has an upward inflected fundamental frequency, when an operator poses a question to the customer during an ordinary call (for example, "Is it broken?", "How is it?", or the like). Thus, it is sometimes difficult to appropriately detect whether or not the operator, namely the user, is in a confused state using the technology described above.

The present disclosure increases the precision of determining a confused state of a user.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A confused state determination device comprising:
an audio receiver that receives input of call audio;
a memory; and
a processor that is connected to the memory and that is configured to detect a questioning utterance in a call-hold duration of the call audio, compute a frequency of the questioning utterance detected in the call-hold duration, and determine a user to be in a confused state in a case in which the computed questioning utterance frequency is a first threshold value or greater,
wherein the confused state is a state in which it is difficult for the user to give an appropriate response, and
wherein:
the processor changes the first threshold value so as to be smaller as the call-hold duration becomes longer, or
the processor computes the first threshold value based on a questioning utterance frequency acquired for a past call-hold duration.

2. The confused state determination device of claim 1, wherein, in a case in which a slope of a fundamental frequency of audio at an end of an utterance duration is greater than a second threshold value, the processor detects audio in the utterance duration as being a questioning utterance.

3. The confused state determination device of claim 1, wherein, in a case in which a predetermined phrase is contained in at least one of a beginning or an end of an utterance duration, the processor detects audio in the utterance duration as being a questioning utterance.

4. The confused state determination device of claim 1, wherein the processor detects the call-hold duration based on an audio signal representing audio of a call counterpart.

5. The confused state determination device of claim 4, wherein, in a case in which a silent duration contained in an audio signal representing audio of the call counterpart is longer than a third threshold value, the processor detects the silent duration as being the call-hold duration.

6. The confused state determination device of claim 4, wherein, in a case in which a music duration contained in an audio signal representing audio of the call counterpart is longer than a third threshold value, the processor detects the music duration as being the call-hold duration.

7. A confused state determination method comprising:
by a processor,
detecting a questioning utterance contained in audio of a user;
acquiring a questioning utterance frequency, which is a number of occurrences per unit time of the questioning utterance detected in a call-hold duration; and
determining the user to be in a confused state in a case in which the acquired questioning utterance frequency is a first threshold value or greater,
wherein the confused state is a state in which it is difficult for the user to give an appropriate response, and
wherein:
the processor changes the first threshold value so as to be smaller as the call-hold duration becomes longer, or the processor computes the first threshold value based on a questioning utterance frequency acquired for a past call-hold duration.

8. The confused state determination method of claim 7, wherein, in a case in which a slope of a fundamental frequency of the audio at an end of an utterance duration is greater than a second threshold value, audio in the utterance duration is detected as being a questioning utterance.

9. The confused state determination method of claim 7, wherein, in a case in which a predetermined phrase is contained in at least one of a beginning or an end of an utterance duration, audio in the utterance duration is detected as being a questioning utterance.

10. The confused state determination method of claim 7, further comprising detecting the call-hold duration based on an audio signal representing audio of a call counterpart.

11. The confused state determination method of claim 10, wherein, in a case in which a silent duration contained in an audio signal representing audio of the call counterpart is longer than a third threshold value, the silent duration is detected as being the call-hold duration.

12. The confused state determination method of claim 10, wherein, in a case in which a music duration contained in an audio signal representing audio of the call counterpart is longer than a third threshold value, the music duration is detected as being the call-hold duration.

13. A non-transitory storage medium storing a program that is executable by a computer to perform confused state determination processing comprising:
- detecting a questioning utterance contained in audio of a user;
- acquiring a questioning utterance frequency, which is a number of occurrences per unit time of the questioning utterance detected in a call-hold duration; and
- determining the user to be in a confused state in a case in which the acquired questioning utterance frequency is a first threshold value or greater, wherein the confused state is a state in which it is difficult for the user to give an appropriate response, and wherein:
- the computer changes the first threshold value so as to be smaller as the call-hold duration becomes longer, or
- the computer computes the first threshold value based on a questioning utterance frequency acquired for a past call-hold duration.

\* \* \* \* \*